United States Patent [19]

Arita et al.

[11] Patent Number: 4,520,494

[45] Date of Patent: May 28, 1985

[54] X-RAY DIAGNOSTIC APPARATUS

[75] Inventors: Masataka Arita, Tustin, Calif.; Mitsuyoshi Matsubara, Tochigi, Japan

[73] Assignee: Tokyo Shibaura Denki Kabushiki Kaisha, Kawasaki, Japan

[21] Appl. No.: 502,117

[22] Filed: Jun. 8, 1983

[30] Foreign Application Priority Data

Jun. 11, 1982 [JP] Japan .................................. 57-99143

[51] Int. Cl.[3] ........................ G03B 41/16; H05G 1/30; H05G 1/10

[52] U.S. Cl. .................................... 378/108; 378/110; 378/112

[58] Field of Search ................ 378/105, 108, 112, 110

[56] References Cited

U.S. PATENT DOCUMENTS

| | | | |
|---|---|---|---|
| 3,939,352 | 2/1976 | Mester . | |
| 3,974,385 | 8/1976 | Grim . | |
| 4,167,670 | 9/1979 | Ingold . | |
| 4,253,048 | 2/1981 | Osako . | |
| 4,295,049 | 10/1981 | Ebersberger et al. | 378/110 |
| 4,309,612 | 1/1982 | Aichinger | 378/108 |
| 4,317,040 | 2/1982 | Wuerflein | 378/105 |

FOREIGN PATENT DOCUMENTS

| | | |
|---|---|---|
| 0047957 | 3/1982 | European Pat. Off. . |
| 2826455 | 12/1978 | Fed. Rep. of Germany . |
| 2440136 | 5/1980 | France . |
| WO82/00397 | 2/1982 | PCT Int'l Appl. . |
| 2005878 | 4/1979 | United Kingdom . |

*Primary Examiner*—Alfred E. Smith
*Assistant Examiner*—T. N. Grigsby
*Attorney, Agent, or Firm*—Cushman, Darby & Cushman

[57] ABSTRACT

A falling load type X-ray diagnostic apparatus comprises a low voltage power source, AC-DC converting means connected to the low voltage power source so as to apply a rectified low DC voltage, chopping means connected to the AC-DC converting means and chopping said DC voltage into a low AC voltage, high voltage applying means for transforming said low AC voltage into a high AC voltage, said high AC voltage being applied as a tube voltage to an X-ray tube from which X-rays are irradiated toward an object to be examined, means for controlling a filament heating power of the X-ray tube, programming means for supplying a control signal to said filament heating control means so as to reduce the emission current of said X-ray tube during the irradiation, and chopper control means for controlling the chopping ratio of said chopping means by evaluating said rectified DC voltage with a preset tube voltage generated in said programming means, said programming means compensating said tube voltage by receiving said control signal in such a manner that said tube voltage is maintained substantially constant during the irradiation by varying said preset tube voltage so as to control the chopping ratio based upon the reduction of the filament heating power for the X-ray tube.

5 Claims, 6 Drawing Figures

X-RAY DIAGNOSTIC APPARATUS

BACKGROUND OF THE INVENTION

1. Field of the Invention

This invention relates to an X-ray diagnostic apparatus in which an X-ray tube voltage can be stabilized.

2. Description of the Prior Art

In a conventional X-ray diagnostic apparatus, it is most important to stabilize an X-ray tube power output as an information source in order to obtain more accurate diagnostic information. An X-ray tube is generally used as an X-ray radiation source. A high voltage (i.e., tube voltage) applied across the two electrodes of the X-ray tube and heating of an X-ray tube filament must be stabilized so as to realize a stable X-ray tube power output.

In an X-ray diagnostic apparatus of an X-ray generation system wherein a maximum permissible initial emission tube current preset in accordance with an object to be examined is reduced in approximation along a load characteristic curve (referred to as a "falling load") simultaneously while a picture is being taken, the initial preset value of the tube voltage will increase from time to time. The tube voltage may often exceed a maximum rating tube voltage of the X-ray tube. In a conventional X-ray diagnostic apparatus, in order to solve the above problem, the tube voltage is decreased in a stepwise manner every time a given short time period has elapsed, so that the tube voltage is kept constant. According to this method, a decrease in tube voltage must be continuously controlled as a function of time. For this purpose, the tube voltage is lowered by electromagnetic switches and line resistors. However, an optimum response cannot be obtained. Therefore, it is difficult to obtain a stable tube voltage and, hence, a stable X-ray tube power output.

FIG. 1 is a block diagram of a conventional X-ray diagnostic apparatus employing a stepwise falling load system. When a line power switch 1 connected in a low voltage source 60 of the X-ray diagnostic apparatus is turned on, a low input voltage is applied to a slidable autotransformer 2. When the tube voltage of the X-ray tube is set by a program unit 3 for controlling X-ray emission, a conductive slidable roller 6 of the slidable autotransformer 2 is controlled such that the primary voltage is regulated through an amplifier (referred to as "AMP") 4 by a DC servo motor to correspond to the tube voltage of the X-ray tube. The maximum permissible initial emission tube current can be preset by the program unit 3 using the preset tube voltage and the load characteristics of the X-ray tube used. A timer 7 is started to execute a tube current timer control program wherein the load or the tube current corresponding to the preset tube emission current is reduced in accordance with the load characteristics. Upon operation of the timer 7, the initial tube emission current is set at the primary winding side of a filament heating transformer 11 through a relay (referred to as "RY") 8. The primary winding side is constituted by a stabilizing power source (referred to as "SPW") 12 for stably controlling heating of the filament and a filament heating resistor 13. The tube emission current is controlled by the timer 7. Since the filament heating resistor 13 is controlled to decrease the tube current at predetermined short timing periods, RYs 9 and 10 are controlled for each X-ray emission in accordance with the program of the timer 7 in the same manner as is the RY 8. The tube voltage changes during X-ray emission, or exposure in synchronism with a falling load time (i.e., a stepwise time interval during which the tube emission current is changed by the RYs 8, 9 and 10) set by the timer 7. A tube voltage changing circuit (to be referred to "VSW") 14 is thus operated by the program unit 3. At the initial period of X-ray emission, all RYs 15, 16 and 17 are closed by the VSW 14, and hence all line resistors 18, 19 and 20 are directly connected to the main circuit.

When X-ray exposure is started under the above-described conditions, an X-ray exposure control circuit 21 is actuated, a main switch 22 is closed, and then a line voltage is applied to a high-tension transformer 23. Meanwhile, the RY 8 is closed in accordance with the program of the timer 7, and the filament of the X-ray tube 25 is heated. A high AC voltage is applied from the high-tension transformer 23 to a high-tension rectifier (referred to as "RECT") 24. The rectified voltage is then applied to the X-ray tube 25. An X-ray is emitted from the X-ray tube 25 and irradiates an object to be examined (referred to as "OBJ") 26. An X-ray picture of the OBJ 26 is formed on an X-ray film 28 through an ionization chamber 27 for automatic exposure control.

During X-ray exposure, when falling load time $t_1$ (e.g., 0.1 s) is reached in accordance with the program of the timer 7, the RY 8 is opened and at the same time the RY 9 is closed. Furthermore, the RY 15 is opened. At falling load time $t_2$ (e.g., 1.0 s), the RY 9 is opened and at the same time the RY 10 is closed. Furthermore, the RY 16 is opened.

The tube current of the X-ray tube is decreased in accordance with the program of the timer 7 as the exposure time elapses. During X-ray exposure, the X-ray output power is detected as an X-ray exposure dosage by the ionization chamber 27. The detected exposure dosage is compared by a comparator (referred to as "COMP") 29 (FIG. 4) with a reference blacking level preset by the program unit 3. When the detected exposure dosage reaches the reference blacking level, the COMP 29 supplies an X-ray emission interrupting signal to the X-ray exposure control circuit 21. The main switch 22 is opened by the X-ray exposure control circuit 21, thereby interrupting X-ray exposure.

FIG. 2 shows a graphical representation of the emission current and the X-ray voltage as a function of exposure time in the X-ray diagnostic apparatus of a falling load system. Referring to FIG. 2, a curve "a" indicates the emission current which is decreased along the exposure time base; a curve "b" indicates the X-ray tube voltage when the tube voltage is not controlled; and a curve "c" indicates the X-ray tube voltage when ideal tube voltage control is performed. However, an actual X-ray tube voltage in the conventional X-ray diagnostic apparatus has a large ripple amplitude as indicated by a curve "d" in an enlarged representation shown in FIG. 3.

In the conventional X-ray diagnostic apparatus employing the falling load system, since the load is mechanically and intermittently decreased by insertion of the line resistor, the X-ray tube voltages respectively indicated by the curve "c" (FIG. 2) and a curve "e" (FIG. 3) cannot be obtained. In the conventional control system, since the tube voltage can be set as large as permitted by the maximum rating voltage of the X-ray tube, the X-ray tube may then be broken when the tube voltage varies during X-ray irradiation. When the tube voltage varies during X-ray irradiation, a wave length (λ) of the X-rays during X-ray exposure may change (FIG. 3), and the X-ray absorbing conditions in the OBJ may change (depending on fat, soft tissue, and bone), degrading X-ray image quality. Furthermore, in the case of forming a conventional tomograph, the tube voltage irregularly changes at tomographic imaging rotational angles. This may result in degradation of the X-ray image quality.

SUMMARY OF THE INVENTION

The present invention has been made in consideration of the above situation, and has for its object to provide an X-ray diagnostic apparatus of an X-ray generating system for decreasing a maximum permissible initial emission tube current in approximation with a falling load of an X-ray tube simultaneously while an X-ray image is being formed, thereby keeping a tube voltage constant.

An X-ray diagnostic apparatus according to the invention, comprises: a low voltage power source, AC-DC converting means connected to the low voltage power source so as to apply a rectified low DC voltage, chopping means connected to the AC-DC converting means and chopping said DC voltage into a low AC voltage, high voltage applying means for transforming said low AC voltage into a high AC voltage, said high AC voltage being applied as a tube voltage to an X-ray tube from which X-rays are irradiated toward an object to be examined, means for controlling a filament heating power of the X-ray tube, programming means for supplying a control signal to said filament heating control means so as to reduce the emission current of said X-ray tube during the irradiation; and chopper control means for controlling the chopping ratio of said chopping means by evaluating said rectified DC voltage with a preset tube voltage generated in said programming means, said programming means compensating said tube voltage by receiving said control signal in such a manner that said tube voltage is maintained substantially constant during the irradiation by varying said preset tube voltage so as to control the chopping ratio based upon the reduction of the filament heating power for the X-ray tube.

According to the invention, in the X-ray diagnostic apparatus of an X-ray generation system under falling load control, even if the tube current is decreased, a constant tube voltage can be obtained by a tube voltage compensation control circuit, so that the controlled tube voltage does not exceed the maximum rating tube voltage of the X-ray tube. For this reason, the wavelength of the X-ray incident to the object becomes constant, thereby obtaining an optimal X-ray image since the X-ray absorbing conditions of the object to be examined become uniform. Furthermore, with tomographs, the tube voltage does not vary at the computed tomographic imaging rotational angle, thereby preventing degradation of the X-ray image quality.

BRIEF DESCRIPTION OF THE DRAWINGS

The present invention will be better understood with reference to the accompanying drawings, in which.

DETAILED DESCRIPTION OF THE PREFERRED EMBODIMENT

Figure 4:
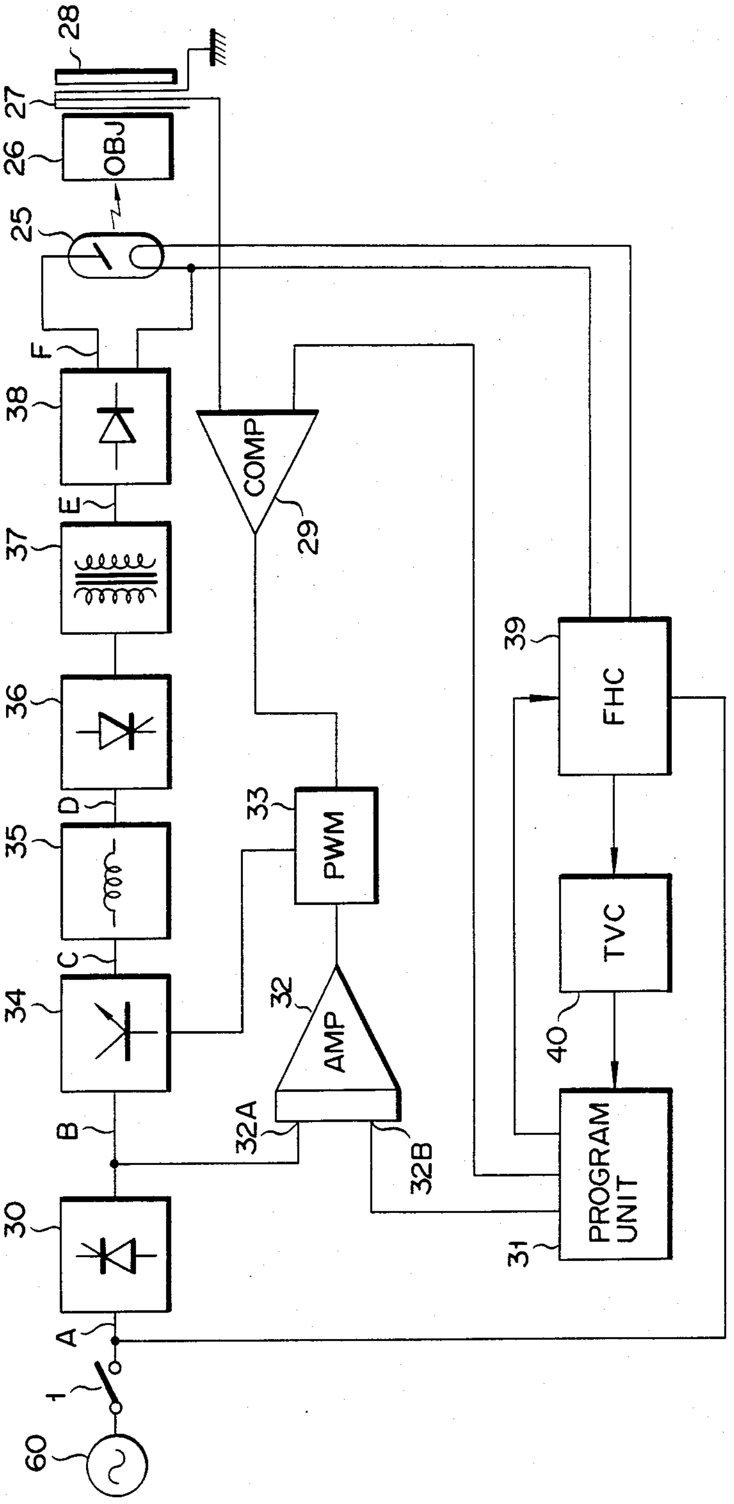
FIG. 4 shows a schematic circuit diagram of one preferred embodiment according to the invention.
Figure 5:
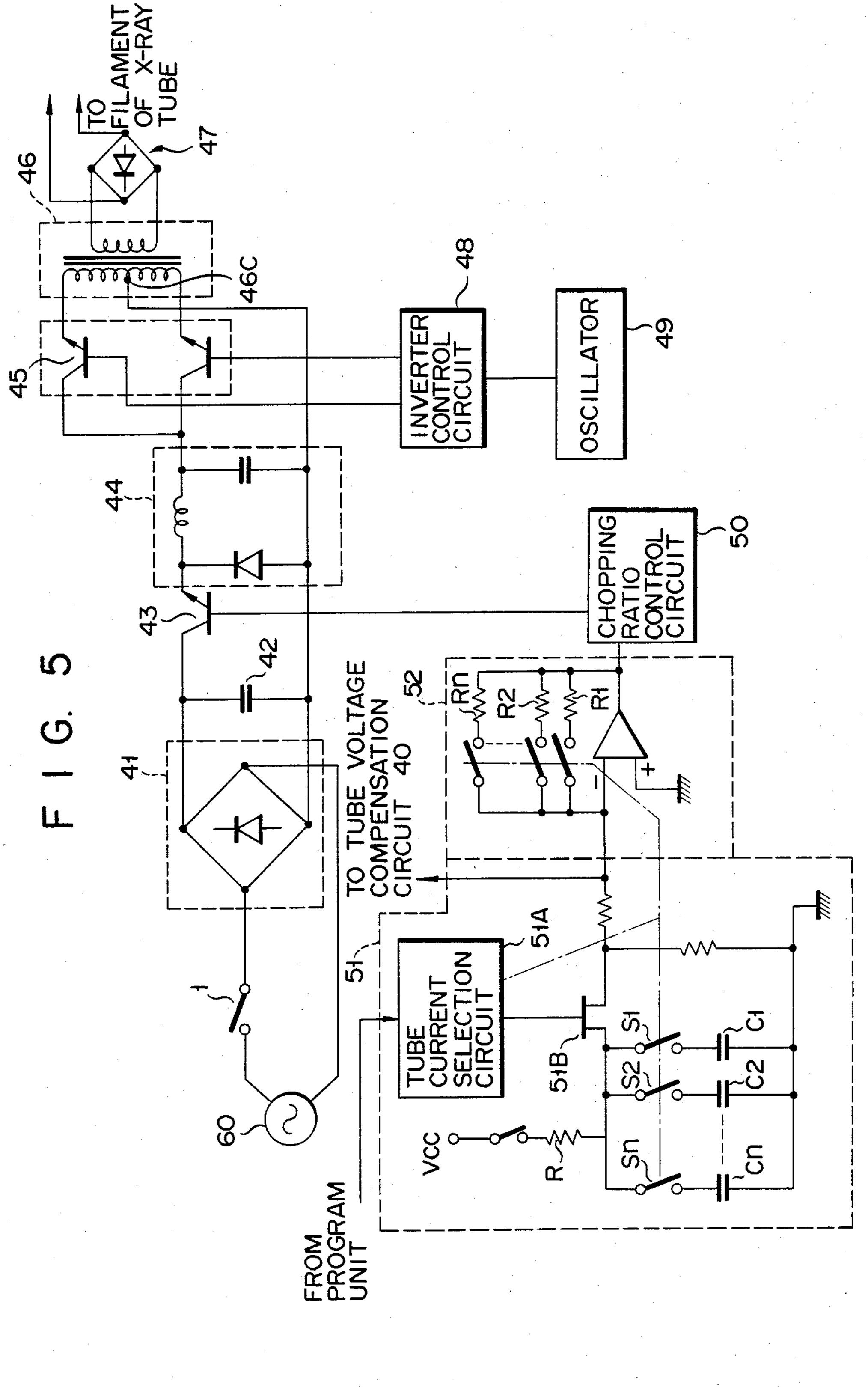
FIG. 5 shows a detailed circuit diagram of the filament heating control circuit shown in FIG. 4.

FIG. 4 shows an X-ray diagnostic apparatus according to an embodiment of the present invention and FIG. 5 is a filament heating control circuit shown in FIG. 4.

Referring to FIG. 4, the line power switch 1 of an X-ray diagnostic apparatus is connected to a commercial AC power source 60. An output side of the switch 1 is connected to an AC-DC converter circuit 30. A program unit 31 for controlling X-ray irradiation serves to set a tube voltage. A differential amplifier (AMP) 32 is connected to the AC-DC converter circuit 30 and the program unit 31 such that an output voltage as an evaluation signal from the AC-DC converter circuit 30 is applied to one input terminal 32A of the differential amplifier 32, and a preset tube voltage as a reference signal from the program unit 31 is applied to the other input terminal 32B thereof. A pulse width modulation circuit (PWM) 33 is connected to receive the output signal from the differential amplifier 32. An output terminal of the AC-DC converter circuit 30 is connected to a chopper circuit 34 which receives a DC voltage therefrom. The pulse width of the DC voltage component supplied to the chopper circuit 34 is controlled by an output signal from the pulse width modulation circuit 33. A chopped output from the chopper circuit 34 is supplied to a filter 35 and is then smoothened by the filter 35. A DC-AC inverter circuit 36 is connected to the filter 35 and serves to perform DC-AC conversion using a given frequency (e.g., several hundreds of Hz). The primary winding of a high-tension transformer 37 is connected to the DC-AC inverter circuit 36. The secondary winding of the high-tension transformer 37 is connected to a high-voltage AC-DC converter circuit 38. An X-ray tube 25 is connected to receive a high voltage rectified by the AC-DC converter circuit 38.

A load side of the power switch 1 is also connected to a filament heating control circuit (FHC) 39. The detailed arrangement of the filament heating control circuit will be described later with reference to FIG. 5. The filament heating control circuit 39 is connected to the program unit 31 through a tube voltage compensation circuit 40 and also thereto directly, thereby preventing an increase in preset tube voltage which tends to increase when the tube current is controlled to decrease. Under this condition, an X-ray from the X-ray tube 25 irradiates the object (OBJ) 26. An X-ray image of the object 26 is then formed on an X-ray film 28 through an ionization chamber 27 for automatic exposure control. The X-ray output power is detected as the X-ray exposure dosage by the ionization chamber 27. The detected exposure dosage is compared by a comparator 29 with a reference blacking level. When the detected exposure dosage reaches the reference blacking level, the comparator 29 controls to interrupt the pulse width modulation circuit 33.

The internal circuit arrangement of the filament heating control circuit 39 will be described with reference to FIG. 5. A full-wave rectifier bridge 41 is connected to the above-mentioned commercial single phase AC power source 60 through the power switch 1. A smoothening capacitor 42 is connected to the rectifier bridge 41 so as to smoothen the rectified output signal from the bridge 41. A chopper transistor 43 is connected to the capacitor 42. The emitter of the chopper transistor 43 is connected to a smoothening circuit or filter 44 which comprises an inductor, a capacitor and a diode, thereby smoothening the chopped output. Two npn inverting transistors 45 are connected in parallel to the positive output terminal of the smoothening circuit 44. Reference numeral 46 denotes an isolation transformer with a primary center tap 46*c*. The center tap 46*c* is connected to the negative output terminal of the smoothening circuit 44, and other two primary winding terminals are respectively connected to the emitters of the npn inverting transistors 45. When the transistors 45 are switched, the directions of current flow with respect to the center tap 46*c* can be switched. A full-wave rectifier bridge 47 is connected such that its output terminals are connected to positive and negative terminals of the filament of the X-ray tube 25 and its input terminals are connected to terminals of the secondary winding, respectively. An inverter control circuit 48 generates a control signal for alternately switching the inverting transistors 45. The inverter control circuit 48 is connected to the bases of the transistors 45. An oscillator 49 is connected to the control circuit 48 and generates a clock pulse having a proper frequency to drive the inverter control circuit 48.

A chopping ratio control circuit 50 for generating a control signal to the chopper transistor 43 is connected to its base. A tube current timer 51 is connected to the program unit 31 (shown in FIG. 4). The timer 51 comprises: a tube current selection circuit 51A for selecting a tube current to be set with reference to the output signal from the tube voltage compensation circuit 40 and for supplying the tube current to a tube current level setting circuit 52 (to be described later); a switching FET (field effect transistor) 51B having the gate connected to the tube current selection circuit 51A; and a time constant circuit. The time constant circuit comprises: a parallel circuit of a plurality of series circuits of switches S1 to Sn and capacitors C1 to Cn; and a resistor R connected in series with the circuit having the plurality of series circuits. The time constant circuit operates such that the switches S1 to Sn are selectively switched in response to the control signal from the tube current selection circuit 51A into which the control signal is supplied from the program unit 31. The tube current level setting circuit 52 described above generates another evaluation signal which indicates a tube current level corresponding to the tube current selected by the tube current selection circuit 51. The gain of the tube current level setting circuit 52 is selected upon operation of the time constant circuit. The output signal from the tube current level setting circuit 52 is then supplied to the chopping ratio control circuit 50. Therefore, the chopping ratio control circuit 50 controls a pulse width (=chopping ratio) of the base control signal applied to the base of the chopper transistor 43 so as to obtain a DC voltage having a level corresponding to that of the output signal from the tube current level setting circuit 52. The full-wave rectifier bridge 47 rectifies the output signal at the secondary winding of the isolation transformer 46. The full-wave rectified voltage is then applied to the filament of the X-ray tube 25. As a result, the filament voltage is controlled such that the tube current preset by the timer 51 flows in the X-ray tube 25.

The operation of the X-ray diagnostic apparatus described above will now be described hereinafter. Referring to FIG. 4, when the line power switch 1 of the X-ray diagnostic apparatus is turned on, a commercial low voltage (e.g., 200 V, 50 Hz) is applied to the converter circuit 30. When the tube voltage is set by the program unit 31 for controlling X-ray irradiation, the above-mentioned preset tube voltage signal corresponding to this tube voltage is applied to the terminal 32B of the differential amplifier 32. The output voltage is applied from the AC-DC converter circuit 30 to the terminal 32A of the differential amplifier 32. The voltage appearing at the terminal 32A is regarded as the above-mentioned evaluation voltage. An output signal which corresponds to a difference between the evaluation voltage and the preset tube voltage at the terminal 32*b* is supplied from the differential amplifier 32 to the pulse width modulation circuit 33. This output signal from the differential amplifier 32 is used to control the degree of pulse width modulation for controlling the chopper circuit 34 which receives the DC voltage component from the converter circuit 30. Since the modulation circuit 33 is controlled by the dosage of X-ray exposure, the pulse width modulation circuit 33 is designed such that its output signal is not supplied to the chopper circuit 34 while the X-ray is not irradiated.

The voltage smoothened by the filter 35 is applied to the inverter circuit 36. The inverter circuit 36 performs DC-AC inversion at several hundreds Hz, for example. The converted voltage is then applied the high-tension AC-DC converter circuit 38 through the high-tension transformer 37. The high voltage rectified by the converter circuit 38 is applied as the tube voltage to the X-ray tube 25.

On the other hand, referring to FIG. 5, the filament voltage for determining the tube current is obtained by power supplied from the single phase AC power source 60. The output power from the single phase AC power source 60 is rectified by the full-wave rectifier bridge 41 and is charged in the capacitor 42. Thus, the charged signal becomes a DC power source output signal. The signal charged in the capacitor 42 is applied to the load (i.e., the filament circuit of the X-ray tube) through the chopper transistor 43 which is rendered conductive for a period while the signal is generated from the chopping ratio control circuit 50. In other words, the another reference signal corresponding to the tube current preset by the timer 51 is produced by the tube current level setting circuit 52, and the chopping ratio control circuit 50 supplies a control output voltage to the base of the transistor 43 such that the control output voltage has the chopping ratio corresponding to the difference between the another reference signal and the another evaluation signal. As a result, the DC output signal chopped by the transistor 43 is supplied to the load so as to obtain a filament voltage which in turn provides the preset tube current. It should be noted that this DC output signal must be smoothened since it is chopped. The chopped DC voltage is converted to a rectangular AC component by the inverter circuit which comprises the inverting transistors 45, the inverter control circuit 48 and the oscillator 49. The oscillator 49 oscillates at a predetermined period. The oscillation output signal is supplied to the control circuit 48 for driving the inverting transistors 45. The control circuit 48 produces the drive control output signal which is then applied to the bases of the inverting transistors 45. As a result, the inverting transistors 45 are alternately switched, and the chopped DC output smoothened by the smoothening circuit 44 is alternately applied to two terminals of the primary winding of the isolation transformer 46. Therefore, at the primary winding having the center tap 46*c* which is connected to the negative terminal of the smoothening circuit 44, the directions of current flow are reversed every time the transistors 45 are switched. The high voltage signal having a rectangular waveform with a period corresponding to the switching duration is transformed by the secondary winding of the isolation transformer 46. The transformed output voltage is rectified by the full-wave rectifier bridge 47, and a rectified and transformed output voltage is applied to the filament of the X-ray tube, so that filament heating by the stable DC output is performed.

The tube current used for X-ray irradiation is set to have the same level as that preset by the timer 51. The chopping ratio control circuit 50 phase-modulates the output level of the tube current level setting circuit 52 at a chopping period and produces a modulated signal. This modulated signal is then supplied to the base of the inverting transistor 43 so as to control the chopping ratio. The AC power of the rectangular waveform is controlled in accordance with the chopping ratio of the chopping ratio control circuit 50, and is supplied to the filament so as to obtain the preset tube current level. As a result, the filament can be stably heated. Thermionic emission from the filament corresponding to the temperature of the heated filament can be performed. In fact, when the tube voltage is applied to the two electrodes of the X-ray tube, the thermions are emitted and the preset tube current flows through the X-ray tube. Therefore, the X-rays which have a dosage corresponding to the tube voltage as well as the tube current are irradated from the X-ray tube.

Figure 1:
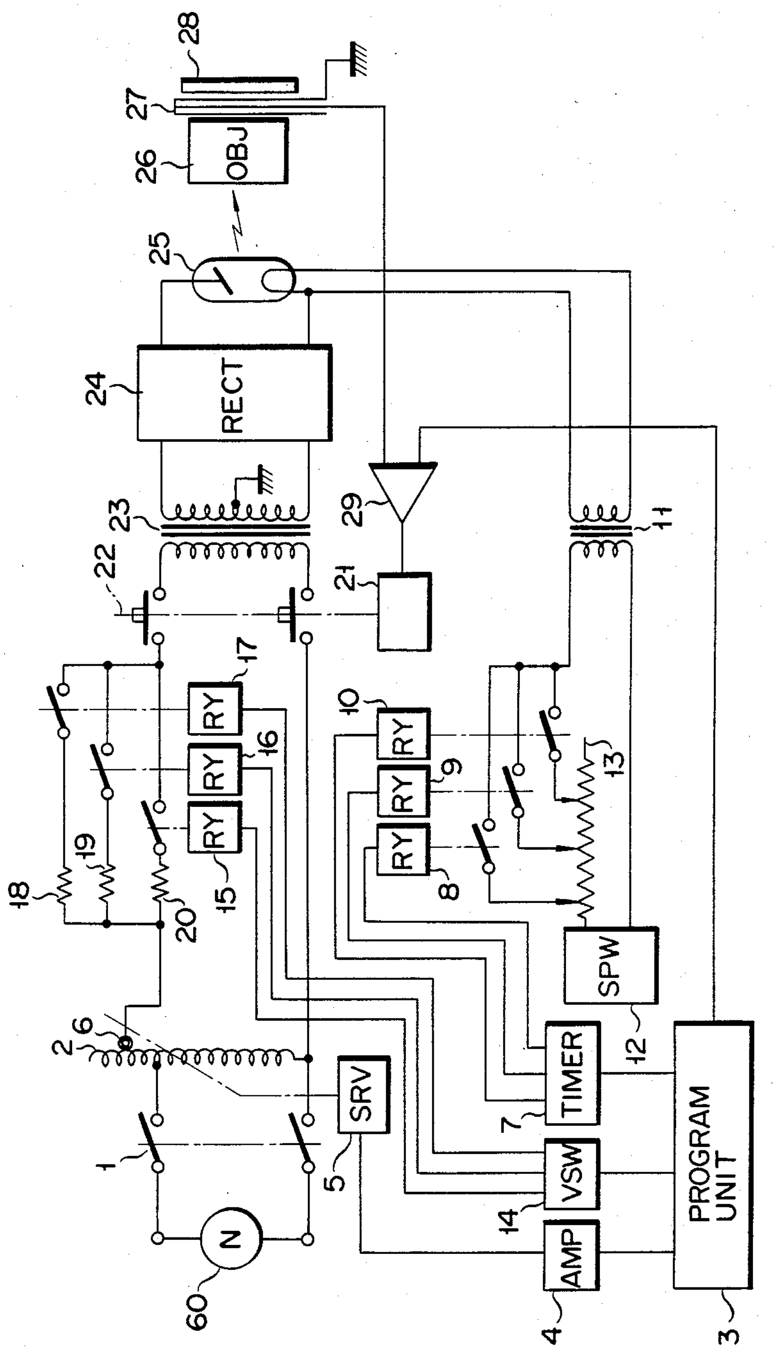
FIG. 1 PRIOR ART
FIG. 1 shows a block diagram of a conventional X-ray diagnostic apparatus.
Figure 2:
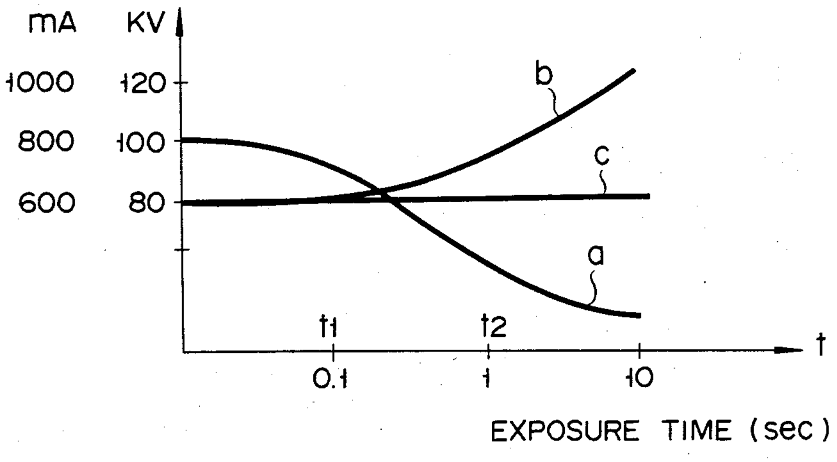
FIG. 2 is a graphical representation of tube current and tube voltage as a function of exposure time.

When the filament of the X-ray tube is heated under the preset conditions, and a high voltage is applied across the X-ray tube 25, the X-ray is irradiated from the X-ray tube 25 to the object 26. The X-ray image of the object 26 is formed on the X-ray film 28 through the ionization chamber 27. In order to decrease the tube current in accordance with the predetermined program during X-ray exposure, the timer 51 operates so as to continuously decrease the tube current as indicated by the curve a (shown in FIG. 2). In this case, when any conventional X-ray diagnostic apparatus is used, the obtained tube voltage becomes higher than the initial preset permissive tube voltage. According to the present invention, in order to cancel an increase in the actual tube voltage, the tube voltage compensation circuit 40 is operated to correct the actual tube voltage (i.e., the actual tube current). The control signal is supplied from the control circuit 40 to the program unit 31, so that the evaluation signal for correcting the initial tube voltage is supplied to the terminal 32B of the differential amplifier 32. The differential amplifier 32 compares the evaluation signal and the output voltage from the AC-DC converter circuit 30 and produces a control signal corresponding to a difference therebetween. This control signal is supplied to the pulse width modulation circuit 33. The chopping ratio of the chopper circuit 34 then can be changed, and the filament current is decreased in proportion to the evaluation signal. As a result, the tube voltage is properly controlled under the constant level. This control operation is continuously and dynamically performed under the condition that the tube voltage compensation circuit 40 is synchronized with the timer

Figure 3:
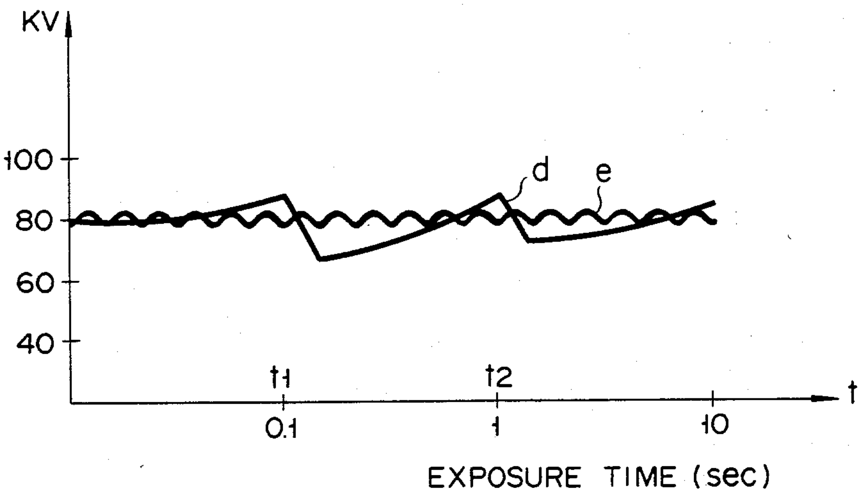
FIG. 3 is an enlarged graphical representation of tube voltage as a function of exposure time.

51. Therefore, the stable tube voltage as indicated by the curve "e" shown in FIG. 3 can be obtained.

On the other hand, the X-ray output power is detected as the X-ray dosage by the ionization chamber 27 during X-ray exposure. The detected dosage is compared by the comparator 29 with the reference blacking level set by the program unit 31. When the dosage reaches the reference blacking level, the comparator 29 supplies the X-ray irradiation interrupting signal to the pulse width modulation circuit 33, so that the chopper control signal is cut off by the modulation circuit 33. As a result, power is not supplied from the chopper circuit 34 to the X-ray tube 25, and the X-ray is interrupted.

Figure 6:
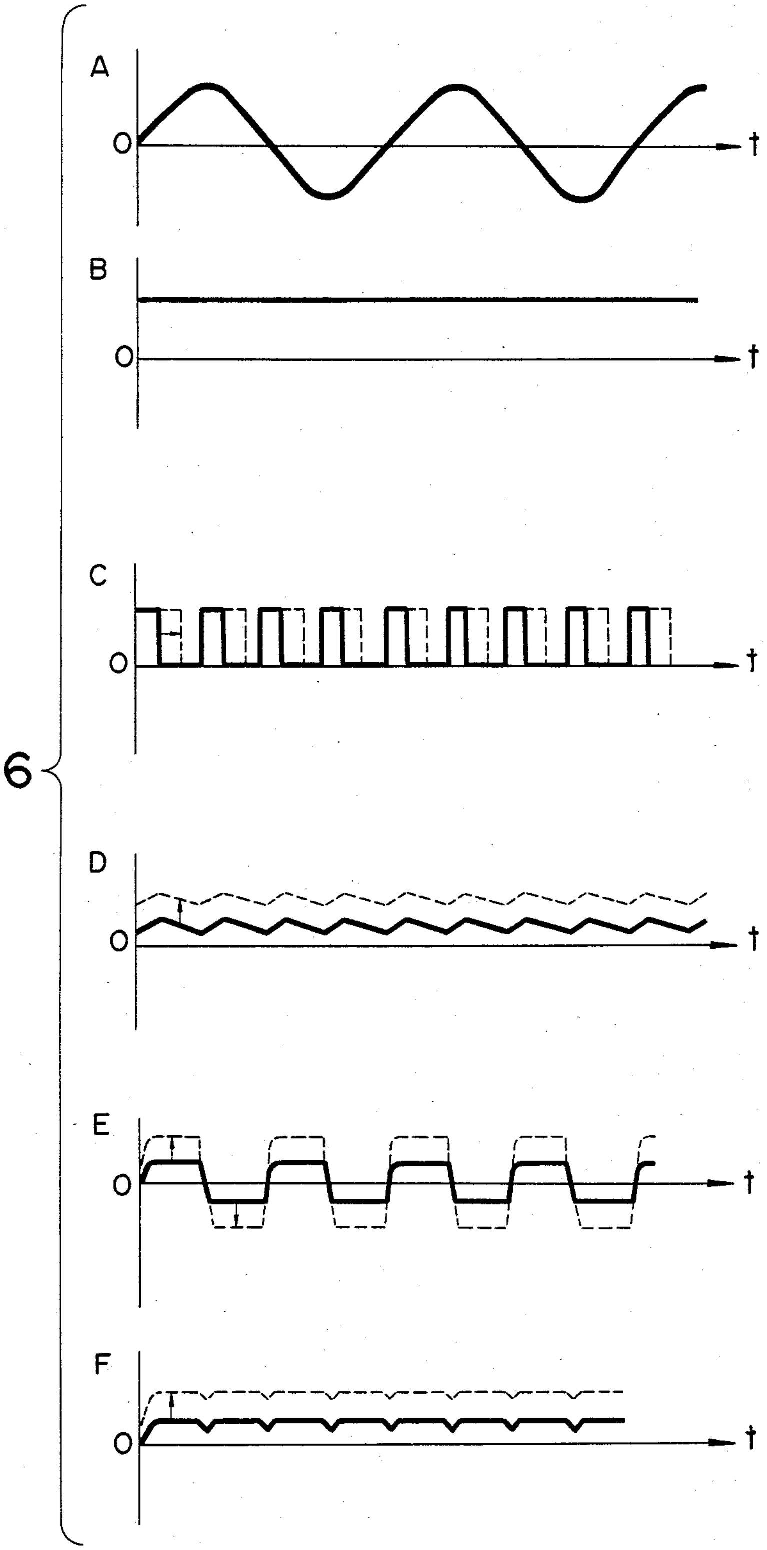
FIG. 6 shows waveforms of output signals appearing at each circuit element shown in FIG. 4.

The waveforms of the signals indicated in FIG. 4 are illustrated in FIG. 6. The signals are visually detected by the known oscilloscope at circuit points A to F in FIG. 4. A voltage waveform of the signal at point A is supplied from the single phase power source 60; this signal has the frequency of 50 Hz to 60 Hz (a commercial three-phase power source may be used in place of the single phase power source). A voltage waveform of the signal at point B is obtained by rectification by the AC-DC converter circuit 30; a voltage waveform of the signal at point C is obtained by chopping by the chopper circuit 34; a voltage waveform of the signal at the point D is obtained by filtering by the filter 35; a voltage waveform of the signal at the point E is obtained by inversion operation by the inverter circuit 36 and the high-tension transformer 37; and a voltage waveform of the signal at the point F is obtained by rectification by the AC-DC converter circuit 38 and is supplied to the X-ray tube. The waveforms at points C to F indicated by the broken curves are obtained when the chopping period changes (is prolonged) from the solid waveforms in FIG. 6.

The present invention is not restricted to the above-mentioned embodiments. Various modifications may be realized by those skilled in the art without departing from the technical scope and spirit of the invention.

If a large chopped voltage can be obtained from the chopper circuit 34, it is possible to directly drive the high-tension transformer 37. That is, the filter circuit 35 and the inverter circuit 36 may be omitted. Similarly the inverter circuit arrangement 45, 48 and 49 may be omitted if the chopped output can directly drive the isolation transformer 46.

In the previous embodiment the tube voltage compensation circuit 40 is independently provided. However, the same function of this compensation circuit 40 may be combined with the program unit 31.

What is claimed is:

1. An X-ray diagnostic apparatus comprising:

a low voltage power source;

AC-DC converting means connected to the low voltage power source so as to apply a rectified low DC voltage;

chopping means connected to the AC-DC converting means and chopping said DC voltage into a low AC voltage;

high voltage applying means for transforming said low AC voltage into a high AC voltage, said high AC voltage being applied as a tube voltage to an X-ray tube from which X-rays are irradiated toward an object to be examined;

means for controlling a filament heating power of the X-ray tube;

programming means for supplying a control signal to said filament heating control means so as to reduce the emission current of said X-ray tube during the irradiation; and chopper control means for controlling the chopping ratio of said chopping means by evaluating said rectified DC voltage with a preset tube voltage generated in said programming means; said programming means compensating said tube voltage by receiving said control signal in such a manner that said tube voltage is maintained substantially constant during the irradiation by varying said preset tube voltage so as to control the chopping ratio based upon the reduction of the filament heating power for the X-ray tube.

2. An X-ray diagnostic apparatus as claimed in claim 1, wherein said filament heating control means comprises:

second AC-DC converting means connected to said low voltage power source so as to apply a second rectified low DC voltage;

second chopping means connected to said second AC-DC converting means and chopping said DC voltage into a second low voltage;

filament power supply means for transforming said second AC voltage into a desired filament heating voltage of said X-ray tube;

tube current selection means including a selectable time constant circuit and connected to receive said control signal from said programming means, whereby a desired time constant is selected by said control signal;

tube current level setting means connected to said tube current selection means so as to generate a tube current level setting signal; and second chopper control means for controlling the chopping ratio of said second chopping means based upon said tube current level setting signal in such a manner that the filament heating power is reduced during the iradiation in accordance with said control signal from said programming means.

3. An X-ray diagnostic apparatus as claimed in claim 1 further comprising:

means for filtering said chopped low voltage from said chopping means; and

DC-AC converting means for converting said filtered chopped voltage into a second low AC voltage, a frequency of which is considerably higher than that of said low voltage power source, said second low AC voltage being applied to said high voltage applying means.

4. An X-ray diagnostic apparatus as claimed in claim 2 further comprising:

means for filtering said chopped low voltage from said second chopping means; and DC-AC converting means for converting said filtered chopped voltage into a second low AC voltage, a frequency of which is considerably higher than that of said low voltage power source, said second low AC voltage being applied to said filament power supply means.

5. An X-ray diagnostic apparatus as claimed in claim 1 further comprising:

means for detecting an X-ray which has penetrated through said object to be examined and for producing a radiation signal in proportion to the detected X-ray dosage; and means for comparing said exposure signal with a preset darkening level signal generated in said programming means, said comparing means being connected to control said chopper control means so as to interrupt a function of said chopping means when said radiation signal level reaches said preset darkening level.

* * * * *